(12) United States Patent
Chen et al.

(10) Patent No.: US 10,812,871 B2
(45) Date of Patent: Oct. 20, 2020

(54) ANALYZING INTERNET PROTOCOL TELEVISION DATA TO SUPPORT PEER-ASSISTED VIDEO-ON-DEMAND CONTENT DELIVERY

(71) Applicant: AT&T INTELLECTUAL PROPERTY I, L.P., Atlanta, GA (US)

(72) Inventors: Yih-Farn Chen, Bridgewater, NJ (US); Rittwik Jana, Montville, NJ (US); Daniel L. Stern, Princeton, NJ (US); Hailong Sun, Beijing (CN); Bin Wei, Basking Ridge, NJ (US); Ping-Fai Yang, Thornhill (CA)

(73) Assignee: AT&T Intellectual Property I, L.P., Atlanta, GA (US)

( * ) Notice: Subject to any disclaimer, the term of this patent is extended or adjusted under 35 U.S.C. 154(b) by 3 days.

(21) Appl. No.: 15/462,468

(22) Filed: Mar. 17, 2017

(65) Prior Publication Data

US 2017/0195749 A1 Jul. 6, 2017

Related U.S. Application Data

(63) Continuation of application No. 14/600,519, filed on Jan. 20, 2015, now Pat. No. 9,635,437, which is a (Continued)

(51) Int. Cl.
*H04N 21/231* (2011.01)
*H04N 21/433* (2011.01)
(Continued)

(52) U.S. Cl.
CPC ..... *H04N 21/812* (2013.01); *H04L 29/06462* (2013.01); *H04N 21/2181* (2013.01);
(Continued)

(58) Field of Classification Search
CPC ......... H04N 21/47202; H04N 7/17318; H04N 7/17336; H04N 21/6587; H04N 21/6125;
(Continued)

(56) References Cited

U.S. PATENT DOCUMENTS

6,115,740 A   9/2000   Mizutani et al.
7,325,073 B2  1/2008   Shao
(Continued)

*Primary Examiner* — Ngoc K Vu
(74) *Attorney, Agent, or Firm* — Guntin & Gust, PLC; Mark Wilinski (57) ABSTRACT

A video-on-demand (VOD) server in an Internet protocol television (IPTV) network with a network of set-top boxes includes IPTV operational data and an analysis module that selects a content item. The VOD server divides the content item into sequential chunks, divides the chunks into stripes, pre-populates set-top boxes in a peering network with at least one stripe from each chunk, receives a request for the content item, and directs each set-top box to sequentially stream its stripes. A method includes selecting a content item based upon IPTV operational data, dividing the content item into sequential chunks, dividing the chunks into stripes, pre-populating set-top boxes in a peering network with at least one stripe from each chunk, receiving a request for the content item, and directing each set-top box to sequentially stream its stripes.

20 Claims, 5 Drawing Sheets

Related U.S. Application Data continuation of application No. 12/624,111, filed on Nov. 23, 2009, now Pat. No. 8,966,553.

(51) Int. Cl.

| | | |
|---|---|---|
| *H04N 21/63* | (2011.01) | |
| *H04N 21/2385* | (2011.01) | |
| *H04N 21/2668* | (2011.01) | |
| *H04N 21/643* | (2011.01) | |
| *H04N 21/472* | (2011.01) | |
| *H04N 21/2225* | (2011.01) | |
| *H04N 21/81* | (2011.01) | |
| *H04N 21/218* | (2011.01) | |
| *H04N 21/2343* | (2011.01) | |
| *H04N 21/235* | (2011.01) | |
| *H04L 29/06* | (2006.01) | |

(52) U.S. Cl.
CPC ....... *H04N 21/2225* (2013.01); *H04N 21/235* (2013.01); *H04N 21/2385* (2013.01); *H04N 21/23439* (2013.01); *H04N 21/2668* (2013.01); *H04N 21/4334* (2013.01); *H04N 21/47202* (2013.01); *H04N 21/632* (2013.01); *H04N 21/64322* (2013.01)

(58) Field of Classification Search
CPC ............... H04N 7/17354; H04N 21/21; H04N 21/23406; H04N 7/22; H04N 21/23439; H04N 21/235; H04N 21/2181; H04N 21/4331; H04N 21/632; H04L 29/06462; H04L 67/104; H04L 67/42; H04L 65/60
See application file for complete search history.

(56) References Cited

U.S. PATENT DOCUMENTS

| | | | |
|---|---|---|---|
| 7,593,326 B2 | 9/2009 | Collet | |
| 8,549,150 B1* | 10/2013 | Roseman | H04N 21/2181 |
| | | | 370/351 |
| 8,966,553 B2 | 2/2015 | Chen et al. | |
| 9,635,437 B2* | 4/2017 | Chen | H04N 21/812 |
| 2002/0078461 A1 | 6/2002 | Boykin | |
| 2003/0005457 A1 | 1/2003 | Faibish | |
| 2003/0055969 A1 | 3/2003 | Begun et al. | |
| 2004/0003101 A1* | 1/2004 | Roth | H04L 29/06027 |
| | | | 709/231 |
| 2005/0081246 A1 | 4/2005 | Barrett | |
| 2008/0059631 A1 | 3/2008 | Bergstrom | |
| 2008/0133767 A1 | 6/2008 | Birrer | |
| 2008/0205291 A1 | 8/2008 | Li | |
| 2008/0307107 A1 | 12/2008 | Chen | |
| 2009/0031154 A1* | 1/2009 | Ikawa | G06F 1/3221 |
| | | | 713/320 |
| 2009/0106802 A1 | 4/2009 | Zuckerman | |
| 2009/0300673 A1* | 12/2009 | Bachet | H04N 7/17318 |
| | | | 725/31 |
| 2010/0094950 A1* | 4/2010 | Zuckerman | H04L 67/1008 |
| | | | 709/213 |
| 2010/0138494 A1* | 6/2010 | Lee | G06Q 30/02 |
| | | | 709/204 |
| 2010/0146094 A1* | 6/2010 | Elkayam | G06F 17/30209 |
| | | | 709/223 |

* cited by examiner

ANALYZING INTERNET PROTOCOL TELEVISION DATA TO SUPPORT PEER-ASSISTED VIDEO-ON-DEMAND CONTENT DELIVERY

CROSS-REFERENCE TO RELATED APPLICATIONS

This application is a continuation of and claims priority to U.S. patent application Ser. No. 14/600,519, filed Jan. 20, 2015, which is a continuation of and claims priority to U.S. patent application Ser. No. 12/624,111, filed Nov. 23, 2009 (now U.S. Pat. No. 8,966,553), the disclosures of which are incorporated herein by reference in their entirety.

FIELD OF THE DISCLOSURE

The present disclosure generally relates to an Internet protocol television system, and more particularly relates to advertising content on an Internet protocol television system.

BACKGROUND OF THE DISCLOSURE

An Internet protocol television (IPTV) service provider can transmit an IPTV signal to a user of the IPTV system via a central office, a serving area interface, and a residential gateway. The IPTV service provider can offer the user a variety of different content and services. For example, the IPTV service provider can supply users with real-time television programs that are typically available for the users to watch only at a specific date and time. The IPTV service providers can also offer the users on-demand movies that are available for an extended amount of time and that are provided to the users upon request of the on-demand movie. The user can also record audio or video content for storage in a digital format on the user's set-top box or on a data server on the IPTV system.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF THE DRAWINGS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the various claimed systems, methods or computer-readable media. Moreover, some statements may apply to some inventive features but not to others.

Figure 1:
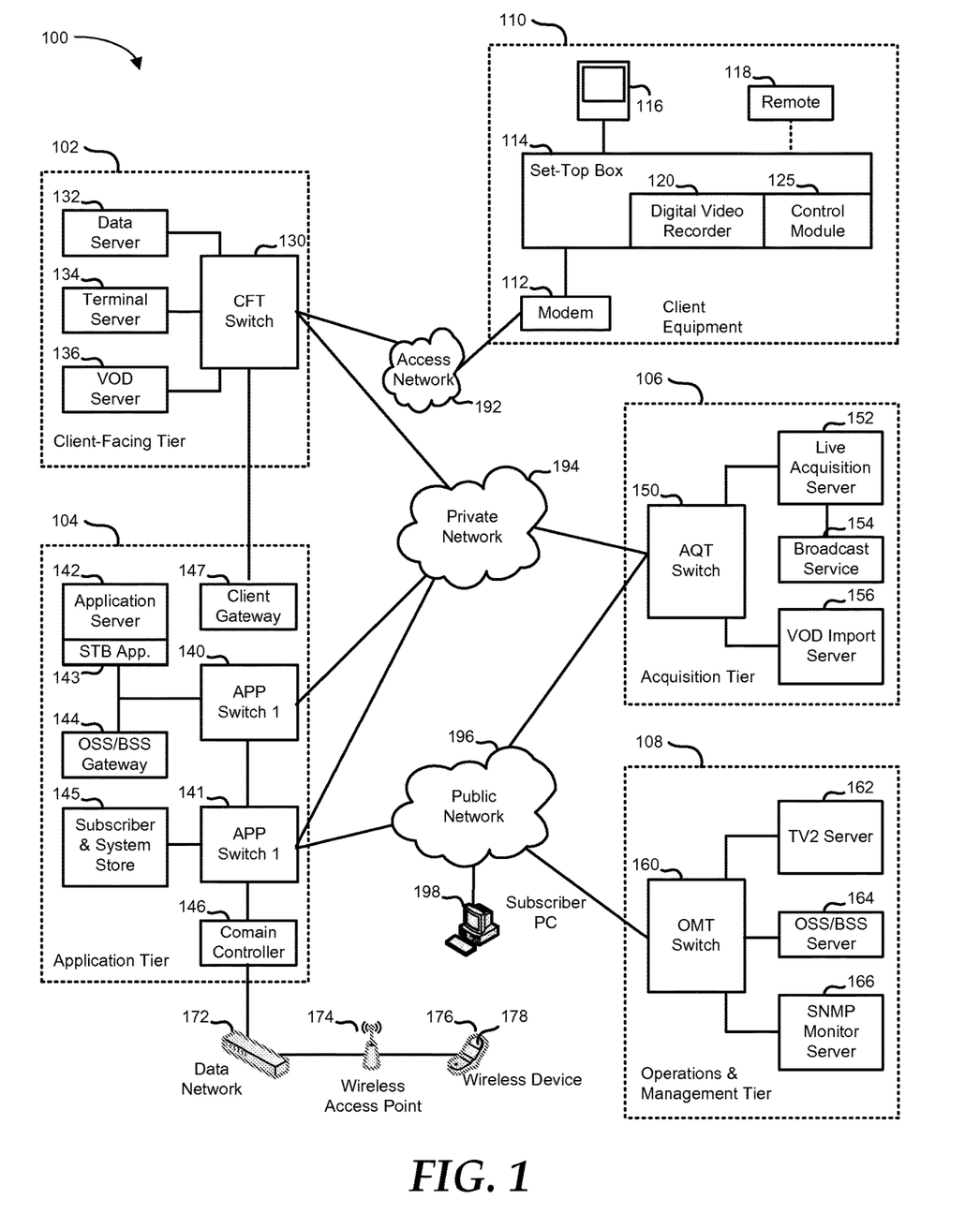
FIG. 1 is a block diagram illustrating an embodiment of an IPTV network.

FIG. 1 shows an embodiment of an IPTV system 100 including a client facing (CF) tier 102, an application tier 104, an acquisition tier 106, an operations and management (OM) tier 108, and one or more sets of client equipment 110. Client equipment 110 is typically located at the home or business premises of a subscriber to the IPTV system 100. IPTV system 100 includes an access network 192, a private network 194, and a public network 196. Each tier 102, 104, 106, and 108 is coupled to one or more of access network 192, private network 194, and public network 196. In an embodiment, CF tier 102 is coupled to access network 192 and to private network 194, application tier 104 is coupled to private network 194 and to public network 196, acquisition tier 106 is coupled to private network 194 and to public network 196, and OM tier 108 is coupled to public network 196. Client equipment 110 is coupled to access network 192.

Networks 192, 194, and 196 communicate information between tiers 102, 104, 106, and 108, and client equipment 110. Access network 192 communicates information between CF tier 102 and client equipment 110. Private network 194 communicates information between CF tier 102 and application tier 104, between application tier 104 and acquisition tier 106, and between acquisition tier 106 and CF tier 102. Public network 196 communicates information between application tier 104 and acquisition tier 106, between acquisition tier 106 and OM tier 108, and between OM tier 108 and application tier 104. Information is also communicated directly between CF tier 102 and application tier 104, as described below. The information communicated between tiers 102, 104, 106, and 108, and client equipment 110 includes encoded television programs, audio files, data files, commands, procedures, other information, or any combination thereof.

CF tier 102 communicates with multiple sets of client equipment 110 over a wide geographic area, such as a regional area, a metropolitan area, a viewing area, or any other suitable geographic area that is supported by access network 192. Client equipment 110 includes a modem 112, a set-top box 114, a display device 116, and a remote control 118. The set-top box 114 includes a digital video recorder (DVR) 120 and a control module 125. Modem 112 is coupled to access network 192, and translates information from a form suitable for transmission over access network 192 to a form suitable for use by set-top box 114, and vice versa. In a non-limiting example, modem 112 is coupled to access network 192 via fiber-optic cables, a digital subscriber line (DSL), another network fabric, or any combination thereof.

The information that CF tier 102 communicates to modem 112 is sent to set-top box 114, which processes the information into a form suitable for display by display device 116 or for recording by DVR 120. Set-top box 114 receives digitally encoded content from CF tier 102 for display on display device 116, or for recording by DVR 120. Set-top box 114 can also receive data from CF tier 102, and render or display the data on display device 116. Further, set-top box 114 can send data to CF tier 102. Such data can include service requests, or commands from the subscriber, received by set-top box 112 via remote control 118. In this way, the subscriber can request services or information or respond to a request for information from IPTV system 100. Control module 125 includes instructions that are executable by set-top box 114 to control the data flow between the subscriber and IPTV system 100. Control module 125 can include an IPTV software platform such as Microsoft® TV IPTV Edition.

Control module 125 can facilitate data communication between set-top box 114 and IPTV system 100. For example, control module 125 can include a procedure whereby set-top box 114 receives a request to record content on DVR 120, or sends a status to IPTV system 100 that the content has been recorded. Likewise, control module 125 can include a procedure whereby the subscriber can interact with IPTV system 100 to receive and execute a viewing preference that the subscriber has created in IPTV system 100. Such preferences can be created via remote control 118, or through a subscriber account that is accessible through public network 196, such as through a subscriber's personal computer 198. A non-limiting example of remote control 118 includes a hand-held controller device, a game controller device, a keyboard/mouse device, another control device, or any combination thereof.

CF tier 102 includes a client-facing tier (CFT) switch 130, a data server 132, a terminal server 134, and a video-on-demand (VOD) server 136. CFT switch 130 manages communication with client equipment 110 through access network 192 and with application tier 104 and acquisition tier 106 through private network 194. CFT switch 130 is coupled to data server 132 that stores data transmitted in response to subscriber requests. CFT switch 130 is also coupled to terminal server 134 that provides terminal devices, such as a game application server, or other devices with a common connection point to private network 194. CFT switch 130 is also coupled to VOD server 136.

Application tier 104 includes application tier (APP) switches 140 and 141, an application server 142, an operation systems and support/billing systems and support (OSS/BSS) server 144, a subscriber and system store 145, a domain controller 146, and a client gateway 147. APP switches 140 and 141 manage communication with CF tier 102 and acquisition tier 106 through private network 194. APP switch 141 also manages communication with acquisition tier 106 and OM tier 108 through public network 196. APP switch 140 is coupled to APP switch 141. APP switch 140 is also coupled to application server 142 and to OSS/BSS gateway 144. Application server 142 provides applications to set-top box 114 through a set-top box application 143, so that set-top box 114 can provide functions such as recording and displaying content, messaging, and processing of IPTV data and VOD material. OSS/BSS gateway 144 includes operation systems and support (OSS) data, and billing systems and support (BSS) data.

APP switch 141 is coupled to domain controller 146 and to subscriber and system store 145. Domain controller 146 provides web access, for example, to subscribers via public network 196. Subscriber and system store 145 includes account information that is associated with subscribers who access IPTV system 100 via private network 194 or public network 196. Application tier 104 also communicates data directly to CF tier 102 through client gateway 147. In this embodiment, client gateway 147 is coupled directly to CFT switch 130.

Client gateway 147 provides subscriber access to private network 194 and tiers coupled thereto. In particular, set-top box 114 accesses IPTV system 100 via access network 192 using information received from client gateway 147. Access network 192 provides security for private network 194. Client equipment 110 accesses client gateway 147 via access network 192 and client gateway 147 allows client equipment 110 to access private network 194 once client equipment 110 is authenticated or verified. Similarly, client gateway 147 prevents unauthorized client equipment (not illustrated), such as hacker computers or stolen set-top box devices, from accessing private network 194 by denying access to these devices beyond access network 192.

For example, when set-top box device 114 accesses IPTV system 100 via access network 192, client gateway 147 verifies subscriber information by communicating with subscriber and system store 145 via private network 194, APP switch 140, and APP switch 141. Further, client gateway 147 verifies billing information and status by communicating with OSS/BSS gateway 144 via private network 194 and APP switch 140. OSS/BSS gateway 144 transmits a query across APP switch 140, to APP switch 141, and APP switch 141 communicates the query across public network 196 to an OSS/BSS server 164 (described below). After the client gateway 147 confirms subscriber and/or billing information, client gateway 147 allows set-top box device 114 access to IPTV system 100 content and VOD server 136 content. If client gateway 147 cannot verify subscriber information for set-top box 114, such as when set-top box 114 is connected to a different twisted pair, or when set-top box 114 is stolen, client gateway 147 denies transmissions to and from set-top box device 114 beyond access network 192.

Domain controller 146 communicates with public network 196 via APP switch 141. Domain controller 146 includes a web portal that allows a subscriber to access IPTV system 100 using a personal computer 198. Domain controller 146 also communicates with a data network 172 that is connected to a wireless access point 174. Wireless access point 174 communicates with a subscriber's wireless device 176 to provide wireless access to IPTV system 100. A non-limiting example of a wireless device 176 includes a cellular telephone, a personal digital assistant, a mobile e-mail device, a portable digital video device, another wireless device, or any combination thereof. Wireless device 176 includes a display device 178 for displaying information from IPTV system 100. Display device 178 includes a text display, a picture display, a video display or any combination thereof.

Acquisition tier 106 includes an acquisition tier (AQT) switch 150, a live acquisition server 152, a broadcast service 154, and a video-on-demand importer server 156. AQT switch 150 manages communication with CF tier 104 and application tier 104 through private network 194, and with application tier 104 and OM tier 108 through public network 196. AQT switch 150 is coupled to live acquisition server 152, and video-on-demand importer server 156. Live acquisition server 152 acquires television content from broadcast service 154. Live acquisition server 152 sends the television content to AQT switch 150 for transmission to CF tier 102 via private network 194. The television content is further encoded at data server 132, and sent to client equipment 110 via access network 192. Set-top box 114 receives the television content from modem 112, decodes the television content, and transmits the information to display device 116 according to commands from remote control device 120.

Additionally, VOD importer server 156 receives content from one or more video-on-demand sources that are outside IPTV system 100, such as movie studios and programmers of non-live content. VOD importer server 156 transmits the video-on-demand content to AQT switch 150, and AQT switch 150 communicates the material to CFT switch 130 via private network 194. The video-on-demand content is stored on VOD server 136. When a subscriber issues a request for VOD content to set-top box 114 through remote control 118, the request is transmitted over access network 192 to VOD server 136 via CFT switch 130. Upon receiving such a request, VOD server 136 retrieves the requested VOD content and transmits the content to set-top box or 114 across access network 192 via CFT switch 130.

OM tier 108 includes an OM tier (OMT) switch 160, a TV2 server 162, the OSS/BSS server 164, and a simple network management protocol (SNMP) monitor server 166. OMT switch 160 manages the communication between OM tier 108 and public network 196. OMT switch 160 is coupled to TV2 server 162, OSS/BSS server 164, and SNMP monitor server 166 that monitors network devices. TV2 server 162 receives television content from live acquisition server 152, or video-on-demand content from VOD importer server 156 through public network 196. The television and video-on-demand content is sent by TV2 server 162 to OMT switch 160 and forwarded to a subscriber of IPTV system 100 who accesses public network 196 through personal computer 198.

Figure 2:
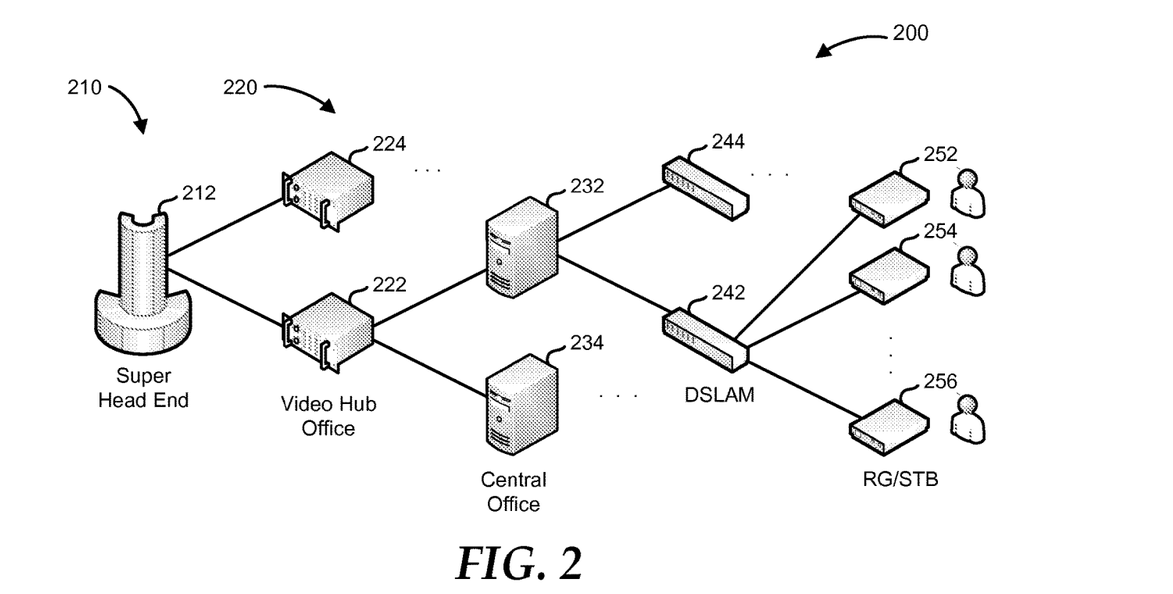
FIG. 2 is a block diagram of an embodiment of a layered video-on-demand system.

FIG. 2 illustrates an embodiment of a layered VOD system 200 that includes a national level 210 and a regional level 220. VOD system 200 provides fiber-to-the-neighborhood (FTTN) and/or fiber-to-the-home (FTTH) access to IPTV services including on-demand and real-time content streaming. National level 210 includes a super head end (SHE) server 212 that functions to receive and store content for distribution within VOD system 200, and handles national level content management. SHE server 212 functions to prepare content for distribution, as for example by converting content received in an analog stream into a codec suitable for distribution via IPTV, and to manage digital rights to the content for VOD system 200. SHE server 212 distributes copies of the content to one or more regions in regional level 220. The content provided by VOD system 200 can include real-time or on-demand television programming, on-demand movie or event content, audio content, web content, or other forms of content. In a particular embodiment, SHE server 212 is similar to acquisition tier 106 in IPTV system 100.

Regional level 220 includes one or more video hub office (VHO) servers 222 and 224. VHO servers 222 and 224 are placed in particular locations to provide regional storage and distribution of the content received from SHO server 212. Thus, for example, a large metropolitan area can be served by VHO server 222, and a different metropolitan area can be served by VHO 224. VHO servers 222 and 224 pass through the real-time content and store the on-demand content received from SHE server 212. VHO servers 222 and 224 receive user requests for real-time content and satisfy these requests by passing through the requested real-time content to the requesting users. VHO servers 222 and 224 also receive user requests for on-demand content, and satisfy these requests by streaming the requested on-demand content to the requesting users. Typically, SHE server 212 will push content to VHO server 222 and 224, such that VHO servers 222 and 224 and SHE 212 have the same content. In a particular embodiment, VHO servers 222 and 224 are similar to VOD server 136 in IPTV system 100.

Regional level 220 also includes several levels of successively more local distribution. Thus, the metropolitan area served by VHO server 222 includes one or more central office servers 232 and 234, and the metropolitan area served by VHO server 224 includes one or more central office servers (not illustrated). Central office servers 232 and 234 are placed in locations to provide area wide distribution of the content received from VHO server 222. Thus, for example, central office 232 can distribute content to the north side of the metropolitan area, and central office 234 can distribute content to the south side of the metropolitan area. Next, the local area served by central office 232 includes one or more digital subscriber line access multiplexers (DSLAMs) 242 and 244, and the local area served by central office 234 includes one or more DSLAMs (not illustrated). DSLAMs 242 and 244 are placed in locations to provide local distribution of the content received from central office 232. For example, DSLAMs 242 and 244 can each distribute content to different neighborhoods in the north side of the metropolitan area served by VHO server 222. DSLAM 242 functions to provide twisted-pair copper wire digital subscriber line (DSL) service to one or more local residential gateways or STBs (RG/STB) 252, 254, and 256, and DSLAM 244 functions to provide twisted-pair copper wire DSL service to one or more local RG/STBs (not illustrated). DSLAMs 242 and 244 typically provide DSL service to up to 192 subscribers. RG/STBs 252, 254, and 256 typically have a download bandwidth capacity sufficient to handle the data traffic of a typical subscriber. For example, a set-top box may have a download bandwidth capacity of 50 megabytes per second (Mbps), and the download bandwidth capacity can be shared by two high definition channels of 6 Mbps each, two standard definition channels of 2 Mbps each, a voice-over-Internet channel, and a high-speed Internet channel. Also, RG/STBs 252, 254, and 256 typically have an upload bandwidth capacity that is lower than the download bandwidth capacity. For example, a set-top box may have an upload bandwidth capacity that is limited to 2 Mbps.

Central offices 232 and 234, and DSLAMs 242 and 244 provide pass through distribution of the content served by VHO servers 222 and 224, and can provide some level of local caching of the content, but do not typically perform the large scale content storage function that is provided by VHO servers 222 and 224. Thus, in a particular embodiment, when a user associated with RG/STB 252 wishes to receive on-demand content, the user makes a request for the content item through RG/STB 252. That request is sent to VHO server 222 through DSLAM 242 and central office 234. VHO server 222 determines if the content item is stored on VHO server 222. If the content item is stored on VHO server 222, then VHO server 222 streams the content item via central office 232 and DSLAM 242 to RG/STB 252. RG/STB 252 displays the content item to the user as it is received, or records the content item on an associated DVR (not illustrated). However, in this embodiment, when the demand for on-demand content is high, the bandwidth capacity of the links between VHO 222 and central office 232, and between central office 232 and DSLAM 242 can become bottlenecked. These bottlenecks are typically managed by increasing the bandwidth capacity of VHO 222 and central office 232 to meet the rising demand.

Central offices 232 and 234, and DSLAMs 242 and 244 can provide control for the distribution of peer-assisted content delivery. Here, in another embodiment, VHO server 222 pre-populates on-demand content on the DVRs in RG/STBs 252, 254, and 256. Then, when the user associated with RG/STB 252 wishes to receive on-demand content, the user makes a request for the content item through RG/STB 252. RG/STB 252 determines if the requested content item has been pre-populated on any of RG/STBs 252, 254, or 256 in the locality served by DSLAM 242. In a particular embodiment, RG/STB 252 makes the determination through a consulting a table in RG/STB 252 that indicates the content available in the locality served by DSLAM 242. In another embodiment, RG/STB 252 makes the determination by requesting the information from RG/STB 252 or central office 232. If the content item is pre-populated in the local peer network of RG/STBs 252, 254, and 256, then RG/STBs 252, 254, and 256 upload the content item to RG/STB 252. Otherwise, the request is sent to central office 232 which determines if the requested content item has been pre-populated on any of RG/STBs associated with DSLAM 244 in the locality served by DSLAM 244. If the content item is pre-populated in the local peer associated with DSLAM 244, then central office 232 uploads the content item from the appropriate RG/STB in the local peer network of DSLAM 244, and streams the content item to RG/STB 252. If none of the local peer networks associated with central office 232 have the content item, of if an uploading peer is otherwise unavailable, then central office 232 sends the request to VHO server 222, and the on-demand content request is handled as describe above. In this way, the link traffic between VHO server 222 and central office 232 and between central office 232 and DSLAM 242 is reduced. In a particular embodiment, a portion of the storage capacity of the DVRs in RG/STBs 252, 254, and 256 is reserved by VOD system 200 for the purpose of pre-populating content items for peer-assisted on-demand content streaming.

As noted above, RG/STBs 252, 254, and 256 typically have a limited upload bandwidth capacity compared to the download bandwidth capacity. Thus, pre-populating an entire content item on RG/STBs 252, 254, and 256, would result in poor playback performance on the downloading RG/STB 252, 254, or 256. For example, if a requested content item is a high definition content item, requiring a download bandwidth capacity of 6 Mbps, and the content item were only pre-populated on a single set-top box with an upload bandwidth capacity of 2 Mbps, then the playback on the requesting set-top box would be starved for content information, resulting in an unsatisfactory user experience.

Figure 3:
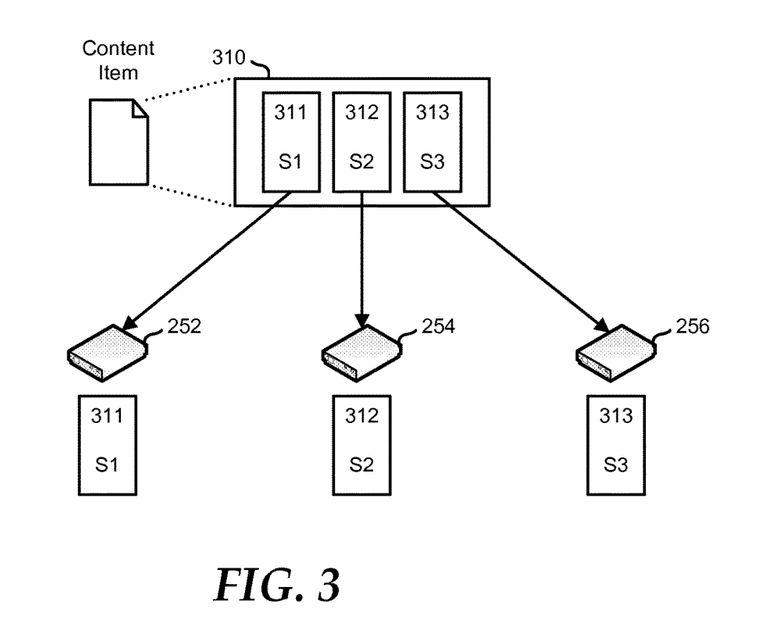
FIG. 3 is an illustration of an embodiment of an on-demand content item that is divided into stripes.

Instead, on-demand content can be divided into stripes, and each stripe can be pre-populated on a different RG/STB 252, 254, and 256, as illustrated in FIG. 3, where a content item 310 is divided into stripes 311, 312, and 313. Stripe 311 is pre-populated onto RG/STB 252, stripe 312 is pre-populated onto RG/STB 254, and stripe 313 is pre-populated onto RG/STB 256. Here, a request for content item 310 is served by RG/STBs 252, 254, and 256 to provide sufficient upload bandwidth capacity to satisfy the download capacity of the requesting RG/STB 252, 254, or 256. Thus, using the above example, the high definition content item can be divided into three stripes, and those stripes can be pre-populated onto three different set-top boxes. Then, when the content item is requested, each of the three set-top boxes uploads the stripe stored thereon with each providing an upload bandwidth capacity of 2 Mbps, and together providing the combined upload bandwidth capacity of 6 Mbps.

Figure 4:
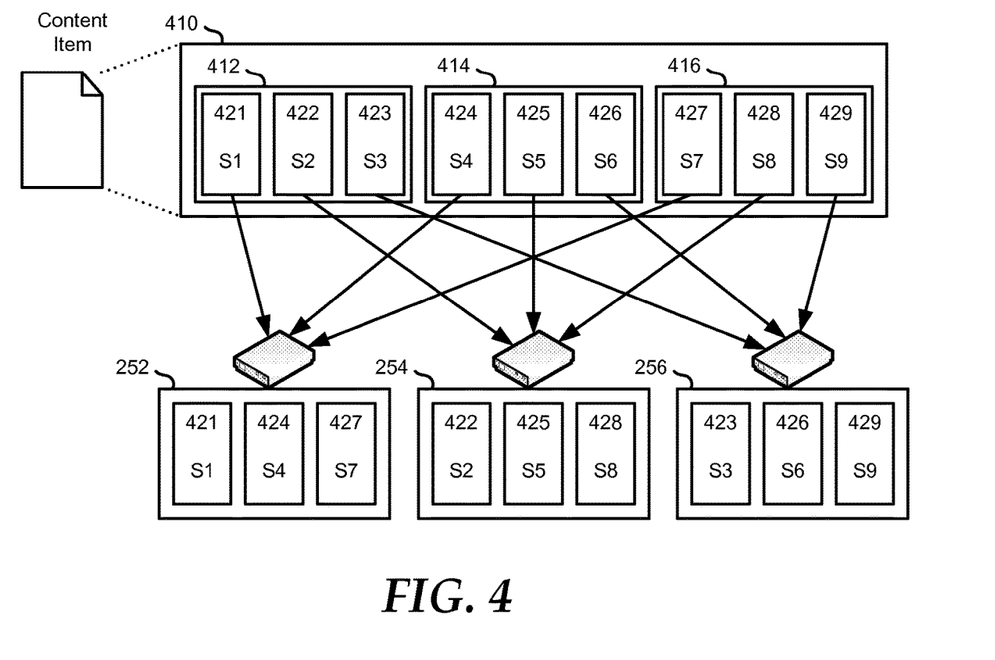
FIG. 4 is an illustration of an embodiment of an on-demand content item that is divided into chunks and then further divided into stripes.

FIG. 4 illustrates a content item 410 that is divided into chunks 412, 414, and 416. Chunks 412, 414, and 416 represent a sequential playable subunit of content item 410. Thus, when RG/STB 252 receives a complete chunk 412, 414, or 416, the portion of content item 410 that is contained therein can be played on RG/STB 252. Chunk 412 is further divided into stripes 421, 422, and 423, chunk 414 is further divided into stripes 424, 425, and 426, and chunk 416 is further divided into stripes 427, 428, and 429. Here, one stripe 421 through 429 from each chunk 412, 414, and 416 is pre-populated on RG/STBs 252, 254, and 256. Thus, RG/STB 252 is pre-populated with stripes 421, 424, and 427, RG/STB 254 is pre-populated with stripes 422, 425, and 428, and RG/STB 256 is pre-populated with stripes 423, 426, and 429. Here, a request for content item 410 is served by RG/STBs 252, 254, and 256 to provide sufficient upload bandwidth capacity to satisfy the download capacity of the requesting RG/STB 252, 254, or 256. However, the uploading can be managed on a chunk-by-chunk basis. Thus, RG/STB 252, 254, and 256 each upload the stripes 421, 422, and 423 associated with chunk 412, then they upload the stripes 424, 425, and 426 associated with chunk 414, and finally they upload the stripes 427, 428, and 429 associated with chunk 416. In this way, uploading can be managed as transfers of smaller data files, and added flexibility is gained in terms of where to pre-populate the stripes and when to upload them. In another embodiment (not illustrated), the stripes are each created to include redundant portions of the content item, such that a smaller number of stripes need to be received to recreate the chunk, than the number of stripes created for each chunk. For example, a chunk can be divided into five stripes each with a redundant portion of the content of the chunk, and the RG/STB can receive four stripes that combine to include the complete data of the chunk.

Figure 5:
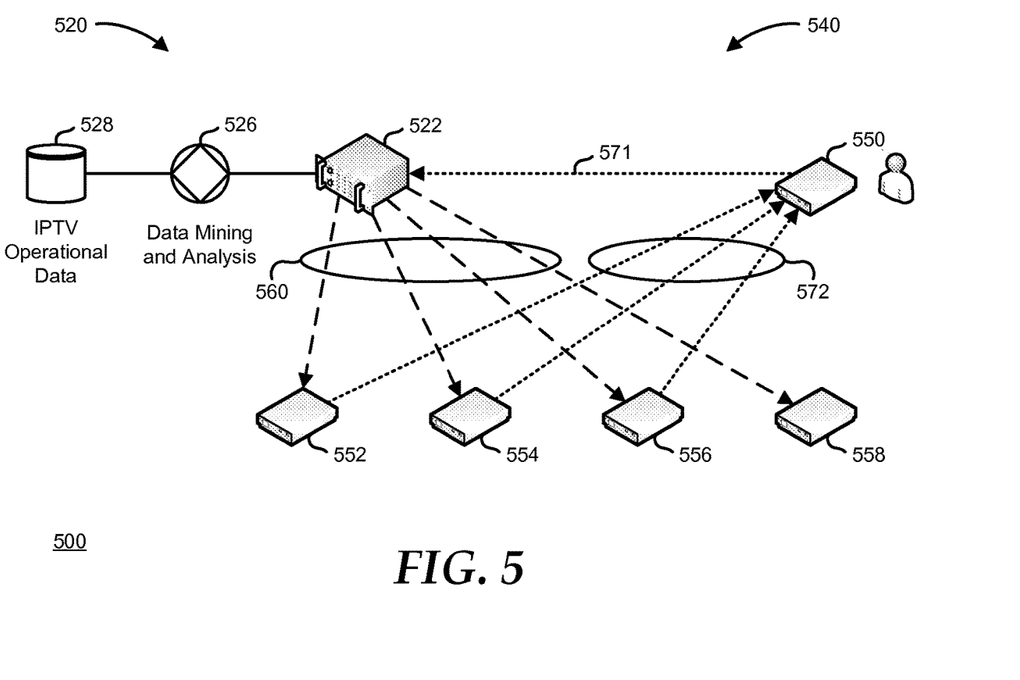
FIG. 5 is a block diagram of an embodiment of a peer-assisted video-on-demand system.

FIG. 5 illustrates an embodiment of a peer-assisted VOD system 500 including a VHO system 520 and a peering network 540. VHO system 520 includes a VHO server 522, a data mining and analysis module 526, and an IPTV operational data storage module 528. Peering network 540 includes RG/STBs 550, 552, 554, 556, and 558. VHO server 522 functions similarly to VHO servers 222 and 224. In addition, VHO server 522 functions to determine the amount of storage capacity that is available in each of RG/STBs 550 through 558 on which to pre-populate particular content items, to determine the particular content items to pre-populate, and when and how the particular content items are pre-populated.

VHO server 522 is coupled to data mining and analysis module 526 and to IPTV operational data storage module 528. IPTV operational data storage module 528 includes a repository of usage data including on-demand content usage statistics, RG/STB power state data, set-top box capacity management data, and other information related to the operation of VOD system 500. Data mining and analysis module 526 functions to process the information in IPTV operational data storage module 528 to determine which content items to pre-populate within peering network 540, and when and how the content is pre-populated.

In a particular embodiment, data mining and analysis module 526 analyzes the on-demand content usage statistics to determine which content items are requested most often, and creates a ranked list of popular titles. Data mining and analysis module 526 revises the ranked list periodically and tracks trends in requests for content items. For example, the number of requests for a popular movie may be high for several days, while the number of requests for an on-demand concert event might peak to a higher level for a day, but then drop off quickly. Then, in combination with the set-top box capacity management data, data mining and analysis module 526 determines how many of the titles in the ranked list peering network 540 has the capacity to store, and directs VHO server 522 to pre-populate the selected content items onto RG/STBs 550 through 558. In a particular embodiment, as the ranked list changes, previously pre-positioned content items that no longer rank high enough to remain pre-positioned are erased from RG/STBs 550 through 558, in order to free up storage capacity for more popular titles.

Data mining and analysis module 526 also evaluates the on-demand content usage statistics with respect to the time of day and day of the week that VOD system 500 experiences the peak number of requests, and directs VHO server 522 as to when to do the pre-populating of the selected content items. For example, data mining and analysis module 526 can determine that on-demand content requests peak between 4:00 PM and midnight on weekdays, but peak between 9:00 AM and midnight on weekends. Thus, data mining and analysis module 526 can direct VHO server 522 to perform the pre-populating of the content items between midnight and 4:00 PM on weekdays, and between midnight and 9:00 AM on weekends.

Further, data mining and analysis module 526 evaluates the RG/STB power state data to determine a safety factor with which to over populate peering network 540. That is, data mining and analysis module 526 may determine that not all of RG/STBs 550 through 558 that are powered on during pre-population will remain powered on during the time of peak on-demand requests. Thus, more copies of a particular content item may need to reside in peering network 550 in order to ensure that the requested content item is available. For example, if 25 percent of the residential gateways in a peering network that are powered on at 3:00 AM are found to be powered off at 9:00 PM, then peering network 540 can be over-populated by 33 percent (1/0.75). Thus, the stripes composing a particular content item can be pre-populated on more than one of RG/STBs 552, 554, 556, and 558, as illustrated by dashed lines 560, in such a way that any three of RG/STBs 552, 554, 556, and 558 are able to satisfy a request for the content item. For example, if RG/STB 558 is not powered on after being pre-populated, and RG/STB 550 makes a request for the content item, illustrated by dotted line 571, then the download bandwidth capacity of RG/STB 550 is satisfied by RG/STBs 552, 554, and 556, as illustrated by dotted lines 572. Similarly, over-populating of stripes in the peer network can be done in case one or more of RG/STBs 552, 554, 556, and 558 fails. This can be done by encoding the stripes with an erasure coding scheme, whereby each stripe includes a portion of information from one or more other stripes, such that the information in the stripe in a failing RG/STB 552, 554, or 556 is made up by the remaining stripes.

Note that the above examples utilize the entire upload bandwidth capacity of the pre-populated set-top boxes. A more realistic scenario would be for the provider of VOD system 200 to allocate only a portion of the upload bandwidth capacity to peer-assisted content delivery, and reserving the remainder of the upload bandwidth capacity for the user. Thus for example, if the portion of the upload bandwidth capacity allocated for peer-assisted content delivery is 200 kilobytes per second (kbps), then the content item would need to be divided into 30 stripes, and each stripe would need to be pre-populated on a different one of 30 set-top boxes to satisfy a download bandwidth capacity of 6 Mbps. Further note that the provider of VOD system 200 can pre-populate multiple copies of selected content items within a peer network, in order to meet a higher demand for the selected content items.

Figure 6:
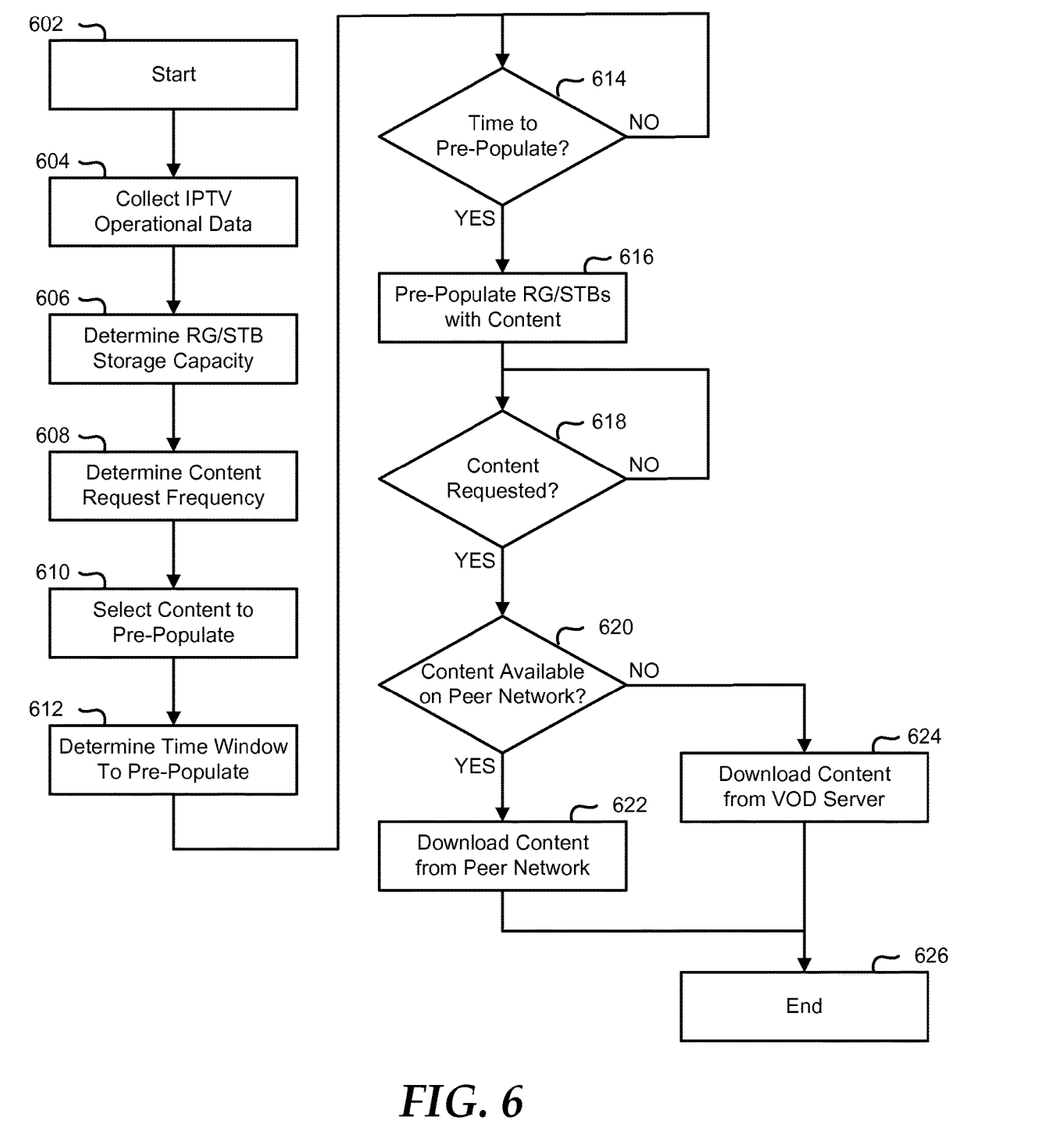
FIG. 6 is a flowchart illustrating an embodiment of a method of analyzing Internet protocol television data to support peer-assisted video-on-demand content delivery.

FIG. 6 is a flowchart illustrating an embodiment of a method of mining internet protocol television data to support peer-assisted VOD content delivery. The method starts in block 602, and IPTV network operational data is collected in block 604. For example, the IPTV network data associated with VOD system 500 can be collected on IPTV operational data storage module 528. The available storage capacity of a peer network of RG/STBs is determined from the operational data in block 606. Thus, data mining and analysis module 526 can determine the available storage capacity of peering network 540 from IPTV operational data storage module 528. The frequency that content items are requested is determined in block 608. Here, data mining and analysis module 526 can create a ranked list of popular titles based upon request frequency data in IPTV operational data storage module 528. The content items to be pre-populated to the peering network are selected in block 610. Thus, data mining and analysis module 526 can select content items from the ranked list to utilize the available storage capacity of peering network 540. A time window in which to pre-populate the peering network with the selected content items is determined in block 612. Here, data mining and analysis module 526 can determine the frequency of content requests per time of day from IPTV operational data 528 and determine that a time of day when data traffic in peering network 540 is low is optimum for pre-populating the selected content items.

A decision is made as to whether or not it is the time window in which to pre-populate the selected content items in decision block 614. If not, then the "NO" branch of decision block 614 is taken and processing loops through decision block 614 until the time window arrives. When the time window arrives, the "YES" branch of decision block 614 is taken, and the RG/STBs in the peering network are pre-populated with the selected content items in block 616. For example, VOD server 522 can pre-populate RG/STBs 550 through 558 with the selected content items. A decision is made as to whether or not a content request has been received in decision block 618. If not, then the "NO" branch of decision block 618 is taken and processing loops through decision block 618 until a content request is received. When a content request is received, the "YES" branch of decision block 618 is taken, and a decision is made as to whether or not the request is for a content item that is available on the peer network in decision block 620. If so, then the "YES" branch of decision block 620 is taken, the requested content item is downloaded from the peer network to the requesting RG/STB in block 622, and processing ends in block 626. If the request is not for a content item that is available on the peer network, then the "NO" branch of decision block 620 is taken, the requested content item is downloaded from the VOD server to the requesting RG/STB in block 624, and processing ends in block 626.

Figure 7:
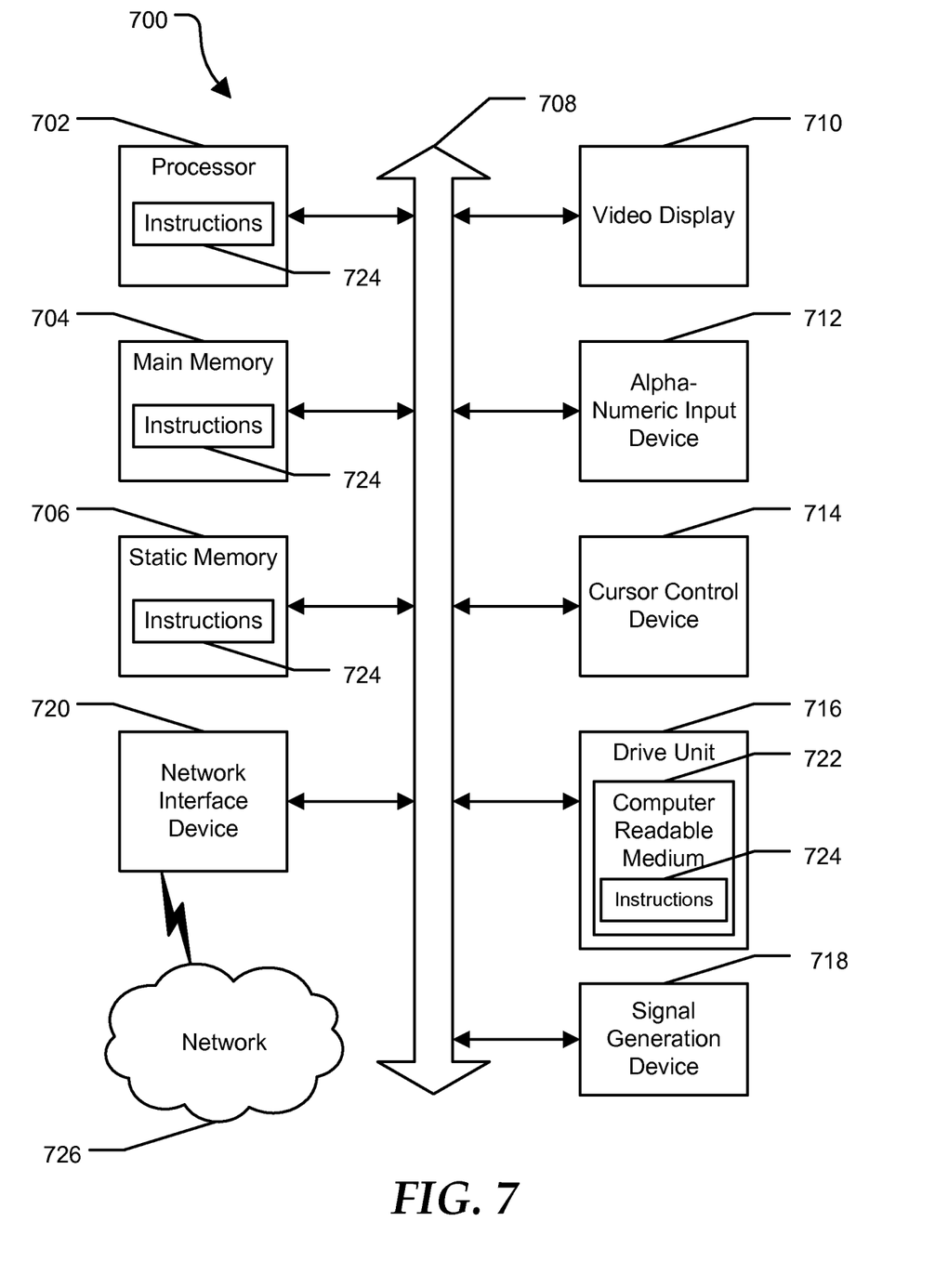
FIG. 7 is a block diagram showing an illustrative embodiment of a general computer system.

FIG. 7 shows an illustrative embodiment of a general computer system 700 in accordance with at least one embodiment of the present disclosure. Computer system 700 includes a set of instructions that can be executed to cause computer system 700 to perform any one or more of the methods or computer based functions disclosed herein. Computer system 700 can operate as a standalone device or can be connected via a network to other computer systems or peripheral devices.

In a networked deployment, computer system 700 operates in the capacity of a server or as a client computer in a server-client network environment, or as a peer computer system in a peer-to-peer (or distributed) network environment. Computer system 700 can also be implemented as or incorporated into various devices, such as a personal computer (PC), a tablet PC, a set-top box, a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, computer system 700 is implemented using electronic devices that provide voice, video or data communication. Further, while computer system 700 is illustrated as a single system, the term "system" shall also be taken to include any collection of systems or sub-systems that individually or jointly execute a set, or multiple sets, of instructions to perform one or more computer functions.

Computer system 700 includes a processor 702 such as a central processing unit (CPU), a graphics processing unit (GPU), or both. Moreover, computer system 700 includes a main memory 704 and a static memory 706 that communicate with each other via a bus 708. Computer system 700 further includes a video display unit 710, such as a liquid crystal display (LCD), an organic light emitting diode (OLED), a flat panel display, a solid state display, or a cathode ray tube (CRT). Additionally, computer system 700 includes an input device 712, such as a keyboard, and a cursor control device 714, such as a mouse. Computer system 700 also includes a disk drive unit 716, a signal generation device 718, such as a speaker or remote control, and a network interface device 720.

In a particular embodiment, disk drive unit 716 includes a computer-readable medium 722 in which one or more sets of instructions 724 are embedded. Instructions 724 embody one or more of the methods or logic as described herein. In a particular embodiment, instructions 724 reside completely, or at least partially, within main memory 704, static memory 706, and/or within processor 702 during execution by computer system 700. Main memory 704 and processor 702 also include computer-readable media. Network interface device 720 provides connectivity to a network 726 such as a wide area network (WAN), a local area network (LAN), or other network. The present disclosure contemplates a computer-readable medium that includes instructions 724 or receives and executes instructions 724 responsive to a propagated signal, so that a device connected to network 726 can communicate voice, video or data over network 726. Further, instructions 724 can be transmitted or received by network 726 via network interface device 720.

In an alternative embodiment, dedicated hardware implementations such as application specific integrated circuits, programmable logic arrays and other hardware devices can be constructed to implement one or more of the methods described herein. Applications that include the apparatus and systems of various embodiments can broadly include a variety of electronic and computer systems. One or more embodiments described herein can implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein can be implemented by software code executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives can be considered a distribution medium that is equivalent to a tangible storage medium. Accordingly, the disclosure is considered to include any one or more of a computer-readable medium or a distribution medium and other equivalents and successor media, in which data or instructions can be stored.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments can be apparent to those of skill in the art upon reviewing the disclosure. Other embodiments can be utilized and derived from the disclosure, such that structural and logical substitutions and changes can be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

The Abstract of the Disclosure is provided to comply with 37 C.F.R. § 1.72(b) and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed is:

1. A device comprising:
a processing system including a processor; and
a memory storing executable instructions that, when executed by the processing system, perform operations comprising:
dividing a selected content item into a plurality of stripes, wherein a first stripe of the plurality of stripes includes a first portion of a media content information that is included in a second stripe of the plurality of stripes, and wherein the first stripe includes a second portion of the media content information that is not included in the second stripe;
determining, by the device and for a peering network comprising a plurality of client media processors, an available storage capacity of each of the plurality of client media processors from network operational data;
determining, for the peering network, a number of the plurality of client media processors to be populated with the plurality of stripes, wherein the determining of the number results in a determined number, wherein the determined number is based on power state data for the plurality of client media processors, and wherein the power state data indicates how many of the plurality of client media processors are expected to be powered off and accordingly unavailable to provide the selected content item when a client media processor requests the selected content item; and
populating each of the determined number of the plurality of client media processors with a different one of the plurality of stripes,
wherein the network operational data comprises a frequency of content requests per each content item for a plurality of content items, wherein the selected content item is selected based upon the frequency of content requests, wherein the selected content item is a most frequently requested content item from among the plurality of content items, and wherein the selected content item is selected in accordance with the available storage capacity.

2. The device of claim 1, wherein the operations further comprise selecting a content item to become the selected content item.

3. The device of claim 1, wherein the determined number of the plurality of client media processors is less than a number of the plurality of client media processors of the peering network.

4. The device of claim 1, wherein the operations further comprise directing each of the determined number of the plurality of client media processors to stream a respective stripe of the plurality of stripes to the client media processor that requests the selected content item.

5. The device of claim 1, wherein the operations further comprise evaluating the power state data to determine a safety factor with which to over-populate the peering network, and wherein the safety factor with which to over-populate the peering network ensures availability of the selected content item to the client media processor that requests the selected content item.

6. The device of claim 1, wherein the operations further comprise determining a time window in which to populate each of the determined number of the plurality of client media processors with the different one of the plurality of stripes, and wherein network operational data comprises a frequency of content requests per time of day, and wherein the time window is determined based upon the frequency of content requests per time of day.

7. The device of claim 1, wherein the dividing the selected content item into the plurality of stripes comprises:
dividing the selected content item into a plurality of sequential portions;
dividing a first one of the plurality of sequential portions into a first plurality of stripes; and
dividing a second one of the plurality of sequential portions into a second plurality of stripes.

8. The device of claim 7, wherein the populating each of the determined number of the plurality of client media processors with the different one of the plurality of stripes comprises:
populating a first one of the determined number of the plurality of client media processors with a first one of the first plurality of stripes of the first one of the plurality of sequential portions;
populating the first one of the determined number of the plurality of client media processors with a first one of the second plurality of stripes of the second one of the plurality of sequential portions;
populating a second one of the determined number of the plurality of client media processors with a second one of the first plurality of stripes of the first one of the plurality of sequential portions; and
populating the second one of the determined number of the plurality of client media processors with a second one of the second plurality of stripes of the second one of the plurality of sequential portions.

9. The device of claim 1, wherein the plurality of stripes includes a third stripe, and wherein each stripe of the plurality of stripes includes the first portion of the media content information.

10. The device of claim 1, wherein the first stripe and the second stripe are associated with a first chunk, wherein the plurality of stripes includes a third stripe and a fourth stripe associated with a second chunk, wherein the first chunk and the second chunk are sequential playable subunits of the selected content item, wherein the populating of each of the determined number of the plurality of client media processors with the different one of the plurality of stripes comprises populating a first client media processor of the plurality of client media processors with the first stripe and the third stripe, and wherein the populating of each of the determined number of the plurality of client media processors with the different one of the plurality of stripes comprises populating a second client media processor of the plurality of client media processors with the second stripe and the fourth stripe.

11. A method comprising:
dividing, by a processing system including a processor, a selected content item into a plurality of stripes, wherein the plurality of stripes comprises a first stripe and a second stripe, wherein the first stripe includes a first portion of a media content information that is included in the second stripe, and wherein the first stripe includes a second portion of the media content information that is not included in the second stripe;
determining by the processing system, for a peering network comprising a plurality of client media processors, an available storage capacity of each of the plurality of client media processors from network operational data;

determining by the processing system, for the peering network, a number of the plurality of client media processors to be populated with the plurality of stripes, wherein the determining of the number results in a determined number, wherein the determined number is based on power state data for the plurality of client media processors, and wherein the power state data indicates how many of the plurality of client media processors are expected to be powered off and accordingly unavailable to provide the selected content item when a client media processor requests the selected content item;

populating, by the processing system, a first one of the determined number of the plurality of client media processors with the first stripe; and populating, by the processing system, a second one of the determined number of the plurality of client media processors with the second stripe, wherein the network operational data comprises a frequency of content requests per each content item for a plurality of content items, wherein the selected content item is selected based upon the frequency of content requests, wherein the selected content item is a most frequently requested content item from among the plurality of content items, and wherein the selected content item is selected in accordance with the available storage capacity.

12. The method of claim 11, further comprising:
selecting, by the processing system, a content item to become the selected content item.

13. The method of claim 11, further comprising:
directing, by the processing system, the first one of the determined number of the plurality of client media processors to stream the first stripe to the client media processor that requests the selected content item; and
directing, by the processing system, the second one of the determined number of the plurality of client media processors to stream the second stripe to the client media processor that requests the selected content item.

14. The method of claim 11, further comprising evaluating, by the processing system, the power state data to determine a safety factor with which to over-populate the peering network, wherein the safety factor ensures availability of the selected content item to the client media processor that requests the selected content item.

15. The method of claim 11, further comprising:
determining, by the processing system, a time window in which to populate the first one of the determined number of the plurality of client media processors with the first stripe and the second one of the determined number of the plurality of client media processors with the second stripe;
wherein network operational data comprises a frequency of content requests per time of day; and
wherein the time window is determined based upon the frequency of content requests per time of day.

16. A non-transitory machine-readable storage medium comprising executable instructions that, when executed by a system including a processor, perform operations comprising:

splitting a selected content item into a plurality of stripes, wherein the plurality of stripes comprises a first stripe and a second stripe, wherein the first stripe includes a first portion of a media content information that is included in the second stripe, and wherein the first stripe includes a second portion of the media content information that is not included in the second stripe;

determining, for a peering network comprising a plurality of media processors, an available storage capacity of each of the plurality of media processors from network operational data;

determining for the peering network a determined number of media processors, each of the determined number of media processors to be populated with one of the first or second stripes, wherein the determined number is based on power state data for the plurality of media processors, and wherein the power state data indicates how many of the plurality of media processors are expected to be powered off and accordingly unavailable to provide the selected content item when a media processor requests the selected content item;

populating a first one of the determined number of media processors with the first stripe;

populating a second one of the determined number of media processors with the second stripe; and evaluating the power state data to determine a safety factor with which to over-populate the peering network with the selected content item, wherein the safety factor with which to over-populate the peering network is selected based on providing availability of the selected content item to the media processor that requests the selected content item, wherein the network operational data comprises a frequency of content requests per each content item for a plurality of content items, wherein the selected content item is selected based upon the frequency of content requests, wherein the selected content item is a most frequently requested content item from among the plurality of content items, and wherein the selected content item is selected in accordance with the available storage capacity.

17. The non-transitory machine-readable storage medium of claim 16, wherein the operations further comprise:
selecting a content item to become the selected content item.

18. The non-transitory machine-readable storage medium of claim 16, wherein the operations further comprise:
commanding the first one of the determined number of media processors to stream the first stripe to the media processor that requests the selected content item; and
commanding the second one of the determined number of media processors to stream the second stripe to the media processor that requests the selected content item.

19. The non-transitory machine-readable storage medium of claim 16, wherein the operations further comprise:
determining a time window in which to populate the first one of the determined number of media processors with the first stripe and the second one of the determined number of media processors with the second stripe.

20. The non-transitory machine-readable storage medium of claim 19, wherein the time window is determined based upon a frequency of content requests per time of day.

* * * * *